United States Patent [19]

Hirayama

[11] 3,791,859

[45] Feb. 12, 1974

[54] STRESS GRADING COATINGS FOR INSULATORS

[75] Inventor: Chikara Hirayama, Murrysville, Pa.

[73] Assignee: Westinghouse Electric Corporation, Pittsburgh, Pa.

[22] Filed: Feb. 4, 1972

[21] Appl. No.: 223,540

[52] U.S. Cl. ............... 117/201, 106/44, 117/125, 174/140 R
[51] Int. Cl. .......................................... H01b 17/42
[58] Field of Search 117/201, 215, 70 A, 70 B, 125; 106/44, 46; 174/140 C, 140 R, 110 R; 252/500, 516, 518, 520

[56] References Cited
UNITED STATES PATENTS
2,590,893  4/1952  Sanborn ............................ 117/125
3,509,072  4/1970  Barrington et al. .................... 106/44
2,797,175  6/1957  Horton ............................... 117/125

FOREIGN PATENTS OR APPLICATIONS
532,117  1/1941  Great Britain ...................... 174/127

Primary Examiner—Ralph S. Kendall
Assistant Examiner—Michael W. Ball
Attorney, Agent, or Firm—H. G. Massung

[57] ABSTRACT

A stress grading coating for insulators comprising a non-linear semiconducting coating, such as silicon carbide, or the like using a glass binder having a fusion temperature of less than 850°C.

11 Claims, 4 Drawing Figures

STRESS GRADING COATINGS FOR INSULATORS

BACKGROUND OF THE INVENTION

This invention relates to the application of a non-linear stress grading coating comprising non-linear semiconducting particles bonded with an inorganic glass onto a high voltage insulator made of ceramic or resin material to prevent corona and lessen the possibility of a flash-over. The non-linear semiconductor particles may be silicon carbide (SiC), ferrous oxide (FeO), ferric oxide ($Fe_2O_3$) or titanium dioxide ($TiO_2$), which when slightly reduced by heating in the absence of oxygen becomes a semiconductor.

High voltage insulators must be made from material having a high dielectric strength, such as ceramics or resin material, but a semiconducting layer over an insulator surface can be used to control voltage stress for improved insulator performance. In the case of an uncoated insulator, voltage distribution across the insulator is not uniform. Thus, even at normal system voltages, partial breakdown may occur at some point on the insulator surface. These discharges can generate radio interference voltages. A semiconducting layer applied over the insulator can prevent these undesirable breakdowns.

Stress grading coatings are often used on high voltage insulators to prevent corona, flashover, or radio interference voltages. Materials presently used for coating the insulator surfaces are silicon carbide paints, or the like, incorporating an organic resin. It is advantageous to use silicon carbide for this purpose due to its desirable non-linear resistance characteristics which allow the paint to behave more efficiently as a stress grading medium. The resistance of the silicon carbide layer varies as a function of the applied electric field, as the electric field increases the resistance of the silicon carbide layer decreases.

An important application of high voltage insulators is on outdoor apparatus, thus, the coating applied must have a good resistance to weather and be impervious to moisture. High pollution concentration in some areas further aggravates the deteriorative effects of weather. In certain other applications, such as an insulator bushing used on a transformer, the stress grading paint is exposed to organic material, such as insulating oil, which has a tendency to attack the paint. This is undesirable since the binder in the silicon carbide paint has a certain amount of solubility in the organic transformer oil, and this will have an adverse effect on the dielectric strength of the transformer oil. It is therefore desirable to have a stress grading coating which is resistant to organic liquids and vapors and which is also moisture resistant.

A stress grading coating which is entirely inorganic in nature and is fired onto the ceramic surface of the bushing is resistant to organic liquids and vapors and is also moisture resistant. However, the use of inorganic coatings in prior art applications have not been entirely satisfactory. In prior art applications, such as described in U.S. Pat. No. 3,389,214 issued June 18, 1968 to W. J. Smothers, which utilizes inorganic stress grading coatings comprising silicon carbide the coatings are applied to the insulator and fired at around 1,150°C for 2 to 5 hours. For economic reasons, the stress grading coatings and the green insulator are usually fired together. Firing at this high temperature for this period of time can have an adverse effect on the stress grading coating comprising silicon carbide. At this temperature a reaction can occur between the glaze and the silicon carbide, when fired, causing bubbles or blisters to form which distort the surface of the insulator. Another disadvantage of the high firing temperature is that it can cuase deterioration of the non-linear resistance properties of the silicon carbide coating.

SUMMARY OF THE INVENTION

This invention relates to the application of a fired-on stress grading coating of a semiconducting material, such as silicon carbide or the like, on a ceramic or resin insulator to prevent corona, flashover and radio interference voltages. The semiconductor coating, such as silicon carbide, is applied to the ceramic or resin body of the insulator after the insulator has been fired, by using an inorganic glass binder, for the semiconducting particles, with a fusion temperature of less than 850°C. In the preferred embodiment, two glasses were found satisfactory as binders. These are:

1.

|  | Percent composition by weight |
|---|---|
| PbO | 22.0 |
| $Al_2O_3$ | 6.6 |
| $B_2O_3$ | 65.3 |
| MgO | 2.6 |
| LiF | 3.4 |
| 2. | |
| $B_2O_3$ | 54.2 |
| $Al_2O_3$ | 11.5 |
| BaO | 34.3 |

These binder glasses result in reproducible non-linear semiconducting coatings, whereas most other glasses adversely effect the non-linear property of the silicon carbide layer. Glass binder 1 has a fusion temperature of approximately 650°C, while glass binder 2 has a fusion temperature of approximately 800°C. The glass particle size is approximately 325 mesh. The silicon carbide powders used have a particle size of between 400 and 600 mesh. Larger silicon carbide particle sizes were tried but resulted in poor reproducibility and low breakdown voltages. The ratio of silicon carbide to glass is between 40–70 parts by volume of glass. Coatings containing less than 30 parts by volume of glass were also evaluated, but it was found they formed uneven coatings with poorly reproducible resistance-voltage characteristics.

The silicon carbide particles and glass are suspended in a solution consisting of 2 percent nitrocellulose in butyl acetate and mixed by a suitable means, such as a ball mill, for approximately 15 minutes, to prepare the mixture for application to the insulator. This solution is then applied to the insulator surface by a suitable means, such as dipping or spraying, and allowed to air dry into a hard surface which may be readily handled. Upon firing the organic binder is burned off and the glass melts and binds the non-linear semiconducting particles, such as silicon carbide. The silicon carbide and glass coating is fired onto the ceramic insulator at a temperature of less than 850°C for approximately 15 minutes. The silicon carbide and glass then form a smooth finish, impervious to moisture, which helps to keep the outer surface of the insulator clean.

The silicon carbide and glass coating can be applied over the glazed surface or to the unglazed surface of a fired insulator. The thickness of the fired-on coating is usually between, approximately, 4–10 mils. The coatings are uniform and tightly adherent to both the glazed and unglazed surfaces. The non-linear resistance-voltage stress characteristic of the glass bonded silicon carbide coating varies with the ratio of glass used in the coating and with the grain sizes of the silicon carbide. For example, the resistance of coatings containing 600 mesh silicon carbide are higher than those containing larger particle sizes with the same volume percent of glass. It has also been determined that the resistance of coatings containing 600 mesh silicon carbide and 60 percent glass is about an order of magnitude higher than a coating containing 600 mesh silicon carbide and 40 percent glass. It has also been noted that the coatings applied to the glazed surfaces have higher resistances than those applied to unglazed ceramic insulators.

By selecting the proper silicon carbide to glass ratio and the proper silicon carbide particle size, it is possible to get a coating which has a voltage resistance characteristic very similar to those obtained in silicon carbide organic paints currently being used as stress grading coatings. When the coating is applied to the ceramic insulator, it is fired in an atmosphere which is reducing, oxidizing or neutral at less than 850°C for approximately 15 minutes. For some applications where the ceramic insulator may be exposed to severe weather conditions an additional protective layer of glaze may be applied over the silicon carbide and glass coating.

BRIEF DESCRIPTION OF THE DRAWINGS

Other advantages of the invention will be apparent from the following detailed description taken in conjunction with the accompanying drawings in which.

DESCRIPTION OF THE PREFERRED EMBODIMENT

Figure 1:
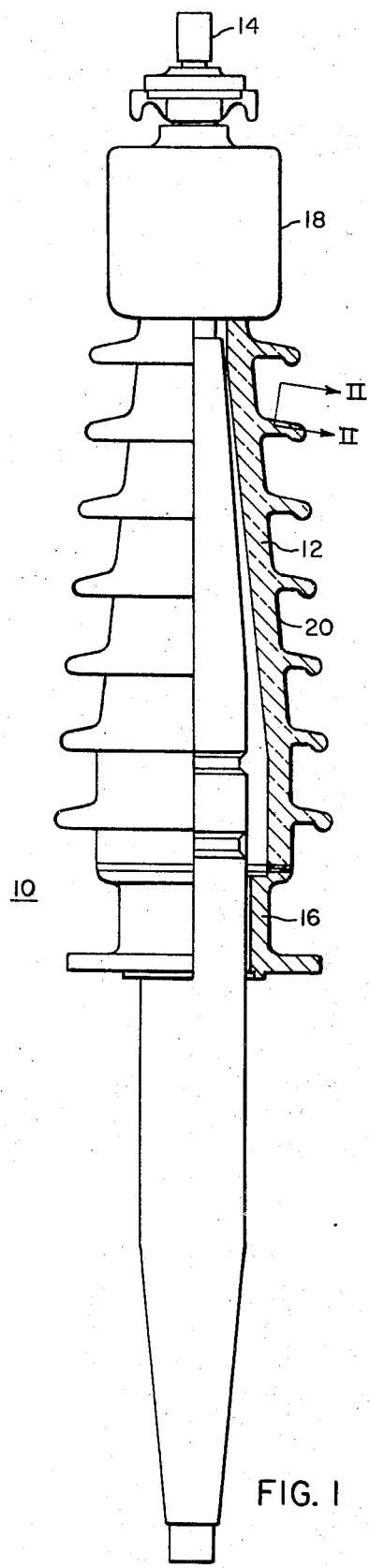
FIG. 1 is a partial view in side elevation of a bushing structure embodying the features of the invention.

Referring now to the drawings, and FIG. 1 in particular, there is shown an insulator bushing 10 comprising an insulating weather housing or body portion 12, an electrically conducting stud 14 and a metallic flange 16. The bushing stud 14 and the bushing top 18 are at a high voltage and the metallic flange 16 is usually at ground potential so that a voltage gradient is present across the insulator 12. It is intended that the body or casing 12 may be constructed from insulating material, such as ceramic or resinous materials. The voltage distribution over the surface 20 of the insulator body 12 is not uniform. The top portion of the body 12 near the bushing top 18 is more highly stressed than the portion near the grounded metallic flange 16. When a non-linear semiconducting coating, whose resistance is an inverse function of the applied voltage, is disposed over the surface 20 of the insulating body 12 the voltage distribution over the insulating body 12 is more uniform.

Figure 2:
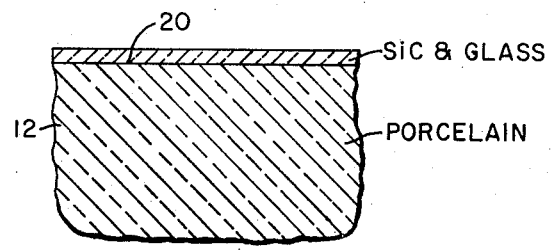
FIG. 2 is an enlarged section on the line II—II of FIG. 1.

FIG. 2 shows the non-linear semiconducting coating of the present invention applied to the surface 20 of the insulator 12 so that the voltage distribution over the surface 20 is more uniform to reduce flashover, corona, and radio interference voltage. FIG. 2 shows a portion of the insulator 12 coated with silicon carbide using an inorganic glass binder. The resistivity of this coating may be altered by varying the thickness of the coating, the silicon carbide to glass ratio, or the silicon carbide particle size. With the proper parameters the voltage-resistance characteristics of this coating can be made very similar to those obtained for silicon carbide stress grading paints which are presently in use.

Figure 3:
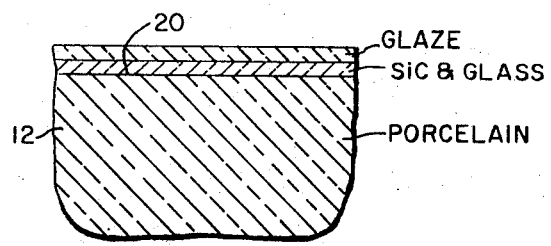
FIG. 3 is a view similar to that of FIG. 2 of a second embodiment of the invention.

FIG. 3 shows a second embodiment of the invention for use on an insulating bushing 10 which may be exposed to severe weather conditions. This embodiment is also useful where the effects of weather are aggravated by severe damp or polluted conditions. As seen in FIG. 3, a protective coating of glaze is applied over the silicon carbide and glass layer which is applied to the porcelain surface 20.

Figure 4:
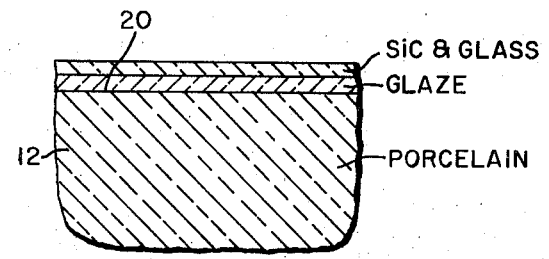
FIG. 4 is a view similar to that shown in FIG. 2 of a third embodiment of the invention.

FIG. 4 shows a third embodiment of the invention. The silicon carbide and glass layer is applied over a glaze which is applied to the porcelain surface 20. This embodiment of the invention is useful when glazed insulators are kept in stock or when the insulators as received from a supplier are already glazed and it is later desired to coat the insulator with a non-linear semiconducting coating.

The apparatus embodying the teachings of this invention has several advantages. For example, this type of coating is especially desirable on outdoor apparatus where the porcelain bushings 10 with a surface 20 is exposed to atmospheric deterioration. Another advantage of this non-linear stress grading coating is that it is entirely inorganic in nature and is not susceptible to attack by the organic insulating materials around which it may be used. Another area where an inorganic bonded silicon carbide layer can be useful is on a system where any outgassing from the coating will be undesirable, such as vacuum interrupters. Another advantage is that this layer is resistant to moisture. This property is important for outdoor application of the stress grading. Another distinct advantage of this inorganic coating is the lower firing temperature as compared with the prior art inorganic coatings. This lower firing temperature of less than 850°C is a distinct advantage since it lessens the deterioration of the non-linear properties of the silicon carbide. Due to lower firing temperature, the non-linear coating is reproducible and does not interact adversely with the porcelain or the glaze.

Since numerous changes may be made in the above-described apparatus and different embodiments of the invention may be made without departing from the spirit and scope of the invention, it is intended that all matter contained in the foregoing description or shown in the accompanying drawings shall be interpreted as illustrative and not in a limiting sense.

I claim:

1. An electric insulator comprising an insulating body, a ceramic coating fired onto said insulating body, said ceramic coating comprising non-linear semiconducting particles of silicon carbide having a particle size of 400 to 600 mesh and a binder for said semiconducting particles, said binder comprising glass having a fusion temperature of less than 850°C, said coating being distributed over the surface of said insulating body.

2. The insulator of claim 1 wherein said insulating body is comprised of ceramic material and said ceramic coating and said binder being fired onto said insulating body at a temperature of less than 800°C for approximately 15 minutes.

3. The insulator of claim 1 wherein a glaze is applied over said insulating body, and said ceramic coating is fired onto said glaze.

4. The insulator of claim 1 wherein a glazed layer is applied over said ceramic coating.

5. An electric insulator as claimed in claim 1 wherein:
said binder comprises 40 percent to 70 percent by volume of said ceramic coating.

6. An electric insulator as claimed in claim 5 wherein:
said binder comprises glass having a fusion temperature of approximately 650°C.

7. An electric insulator as claimed in claim 6 wherein:
said binder comprises PbO, $Al_2O_3$, $B_2O_3$, MgO, and LiF.

8. An electric insulator as claimed in claim 6 wherein:
said binder comprises a glass having substantially a percent composition by weight of 22.0 PbO, 616 $Al_2O_3$, 65.3 $B_2O_3$, 2.6 MgO, and 3.4 LiF.

9. An electric insulator as claimed in claim 5 wherein:
said binder comprises glass having a fusion temperature of approximately 800°C.

10. An electric insulator as claimed in claim 9 wherein:
said binder comprises $B_2O_3$, $Al_2O_3$, and BaO.

11. An electric insulator as claimed in claim 10 wherein:
said binder comprises a glass having substantially a percent composition by weight of 54.2 $B_2O_3$, 11.5 $Al_2O_3$, and 34.3 BaO.

* * * * *